United States Patent Office 3,208,311
Patented Sept. 28, 1965

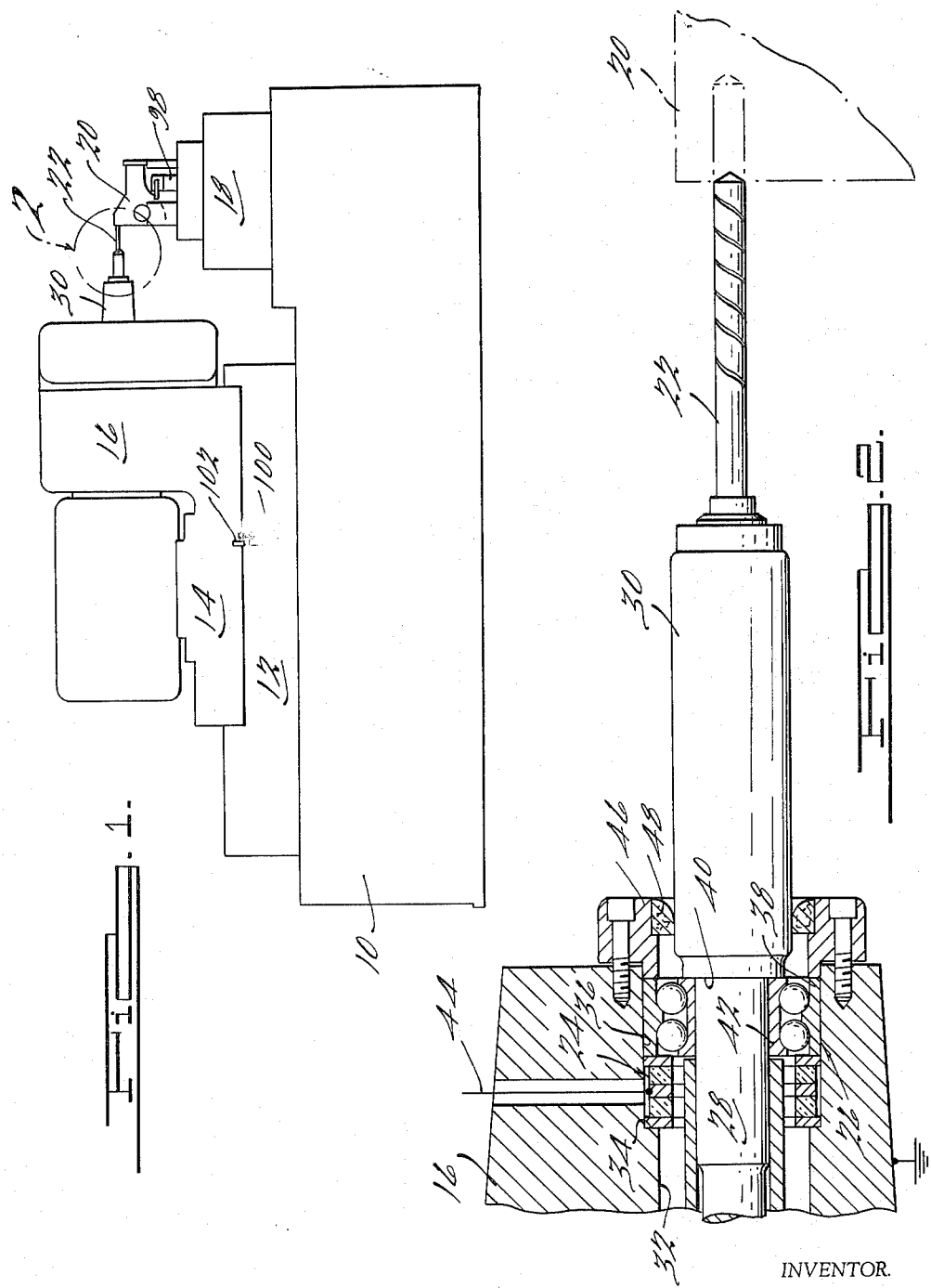

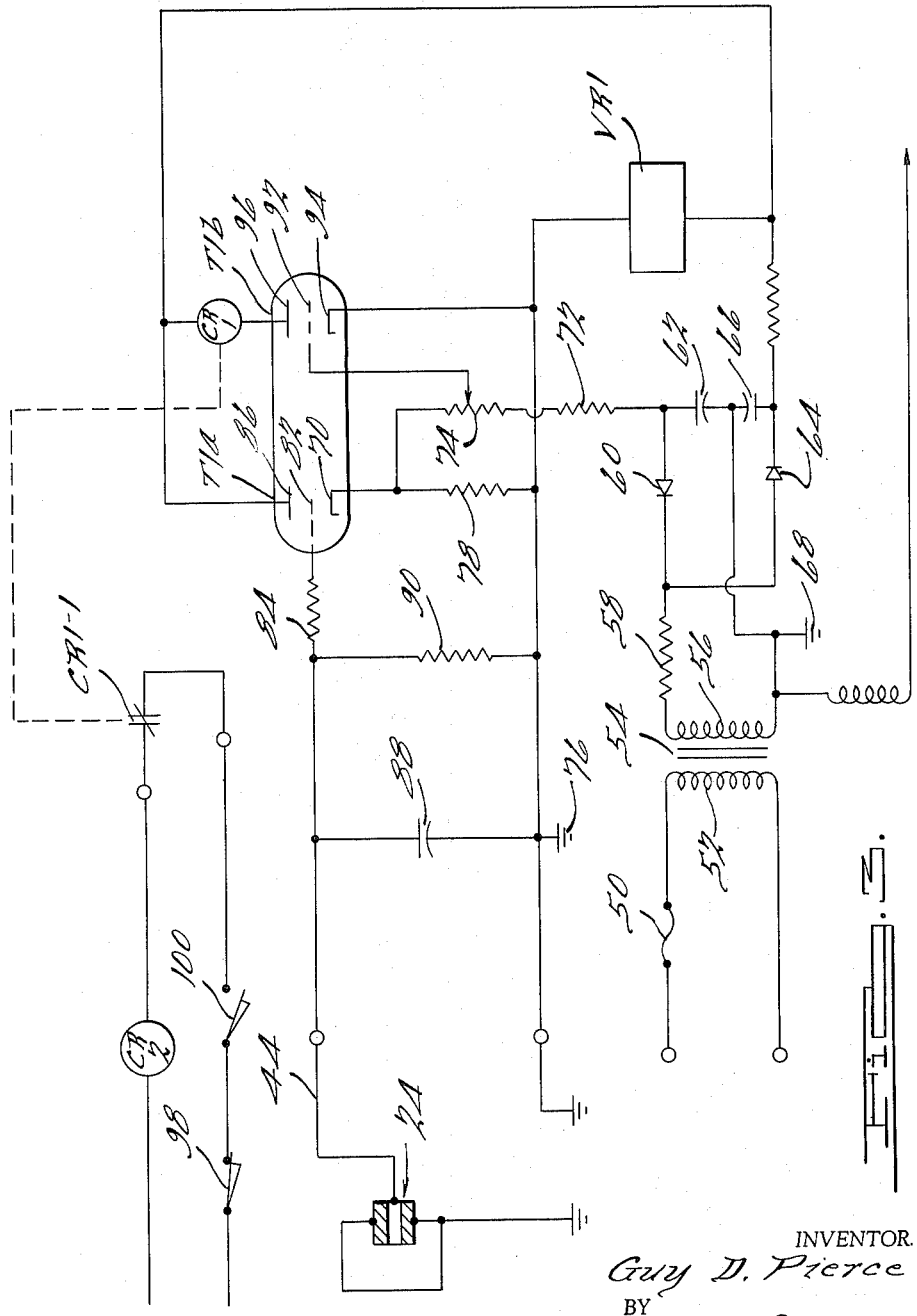

3,208,311
TOOL DETECTOR
Guy D. Pierce, Franklin, Mich., assignor to The Cross
Company, Detroit, Mich., a corporation of Michigan
Filed Apr. 4, 1963, Ser. No. 270,607
10 Claims. (Cl. 77—5)

This invention relates to electrical tool detector apparatus for sensing a broken or misset tool in a machine tool and adapted particularly for use on large multistation machines.

The prompt detection of a broken tool or of a tool such as a drill for example which has been set too short is exceedingly important, and this is particularly true in the case of large multistation automatic machine tools which frequently are attended by only one or two men, and wherein many if not most of the work stations in which the tools operate are so far removed from the normal position of the operator or operators that they cannot constantly visually keep track of the tools. A typical example of such a machine tool is a transfer machine of the type commonly used in high production operations. In these machines, workpieces conventionally are moved automatically by transfer devices progressively from one station to another, and different cutting or other operations are performed on the workpieces as they move progressively from station to station in the machine. For example, holes drilled in the work in one station may be sequentially reamed, chamfered and tapped as the work moves on through later stations in the machine. If one of the drills in the first station is broken or set too short and not immediately detected, the hole which that drill was intended to make is either not drilled at all or it is not drilled to a proper depth and when the workpiece moves to the successive stations, the reaming, chamfering and tapping tools which are to work on that hole come in and are broken or damaged. Moreover, the damage frequently is not limited to the tools themselves but extends to the tool holding and actuating parts of the machine.

As a result, a number of workpieces may have to be scrapped and expensive equipment may be extensively damaged. Moreover, in key situations, the production schedule of the entire factory may be interrupted until necessary repairs can be made.

Various solutions to this problem have been suggested. For example the Cross et al. Patent Re. 24,491, owned by the same assignee as this application, discloses apparatus for programming tool changes in a machine tool of the type hereunder consideration so that the possibility of tool breakage because the tool is used too long or becomes extensively dull is greatly reduced. However, this apparatus does not detect a misset tool and it does not detect a broken tool or apprise the operator of the fact that a tool is broken.

In the Tech et al. Patent No. 2,978,689, also owned by the same assignee as this application, a transducer is associated with each tool spindle so as to measure the amount of thrust exerted by the tool against the work and electrical apparatus connected to the transducer is provided for recording the amount of thrust and for shutting down or otherwise controlling the operation of the machine tool in the event the amount of thrust becomes so great as to indicate that the tool has become dull and requires changing. However, this apparatus requires that the electrical equipment distinguish in every instance between the pressure exerted by a tool that is sufficiently sharp and the pressure exerted by a tool that has become so dull as to require changing; in addition, it is necessary that the equipment not respond to variable conditions other than tool sharpness which affect the pressure of the tool against the work such, for example, as localized hard spots in the work itself. Some difficulty has been encountered in developing electrical equipment of sufficient sensitiveness or that responds only to variations in tool sharpness.

Still another solution to the problem is shown in the Cross et al. Patent No. 3,025,728, also owned by the assignee of this application. This patent shows a tool detector apparatus having sensing coils mounted on the bushing plate or otherwise in proximity to the work through which the tools pass as they move to and from the work. However, some complications arise from the necessity of mounting the sensing coils in proximity to the work and additional problems are created by damage to the coils or other parts of the apparatus by metal shavings coming off the work with the cutting tool.

Thus, while all of the patented apparatuses hereinabove referred to are commercially practicable and indeed several have had considerable commercial success, they all have drawbacks which affect their ultimate utility and there is need for an apparatus which accomplishes the same purpose but is not subject to the faults and disadvantages enumerated above.

An important object of the present invention is to provide a tool detector apparatus that will sense a broken tool or a tool which is set too short and, immediately upon sensing either of these conditions generate an electrical signal that can be utilized to light a warning bulb or otherwise signal the operator or to perform some mechanical operation such as shutting down the machine.

Another object of the invention is to provide a tool detector apparatus wherein the electrical equipment is not required to respond to or distinguish between closely related variations in conditions and wherein the sensing elements are not exposed in use to damage or abuse.

Other objects and advantages of this invention will be apparent during the course of the following description.

In the drawings, forming a part of this specification and wherein like numerals are employed to designate like parts throughout the same:

FIGURE 1 is a side elevational view showing a typical work station of a machine tool of the type with which the tool detector apparatus of this invention is adapted to be used and particularly illustrating the manner in which parts of the apparatus are mounted on and associated with the machine;

FIG. 2 is an enlarged view of the portion of FIG. 1 enclosed in the circle 2 with parts broken away and shown in section for clearness of illustration; and FIG. 3 is a diagrammatic view of the electrical circuitry used in the tool detector apparatus.

Reference is now had to FIG. 1 which shows the work station of a machine tool and a typical environment for the apparatus of this invention. While only one work station is shown, it will be appreciated that the present invention has primary utility in large multi-station machines where the cutting tools are so numerous and so spread out that a machine operator cannot readily keep track of the tools and of their condition. In every instance, however, the environment will normally be the same in all of the work stations insofar as this invention is concerned, and the various components of the tool detector apparatus will be associated in the same way or in an equivalent manner with the work and with the operating parts of the machine tool.

More particularly, the work station here shown has a base 10 which carries a support 12 on which the saddle 14 of the tool head 16 is slideably mounted. A support 18 for the workpiece 20 also is mounted on the base 10 so as to position the workpiece properly for engagement by the cutting tool here shown in the form of a drill 22. It will be readily appreciated in this connection that machines of the type hereunder consideration are adapted to perform many different operations on different kinds and types of workpieces. Accordingly, the work support 18 may vary in size and shape depending upon the nature of the workpiece to be supported thereby and the cutting tool may be any suitable or conventional tool required for the particular operation at hand. Suffice it to say that, in the particular work station here shown, the workpiece 20 is transferred into the station in any suitable or conventional way and deposited on the work supports as shown in the drawing. These machines conventionally are equipped with suitable work locating and clamping means which position the workpiece accurately with respect to the cutting tool 22 and hold it securely in the located position during the work operation. After the workpiece 20 has been located and clamped, the head 16 is advanced to engage the cutting tool 22 with the workpiece and after the cutting operation is completed the head is retracted to disengage the tool from the work. Thereafter the workpiece 20 is transferred out of the work station and either delivered to a subsequent station in the machine or removed from the machine for further handling and processing. The work transfer device, the locating and clamping mechanisms and the actuators for the tool head 16 are not shown inasmuch as they comprise no part of the present invention, but it will be understood that any conventional mechanisms for performing these operations can be used.

As suggested, the tool detector apparatus of this invention includes a transducer 24 which preferably is mounted at some convenient location in the tool head 16 where it is subject to pressure occurring when the tool 22 engages the work 20. In the head 16 here shown by way of illustration, the transducer 24 is mounted directly behind the front spindle bearing 26 which as shown is a combination radial and thrust bearing. The spindle 28 of course also is supported for rotation by suitable bearings at the rear of the head 16, and an electric motor or the like is connected to the spindle according to conventional practice to rotatably drive the same. A chuck 30 on the forward end of the spindle 28 removably receives and retains the drill 22.

More particularly, the bore 32 in the tool head 16 through which the spindle 28 extends is counterbored at the forward end thereof to receive the transducer 24 and spindle bearing 26. The transducer 24 seats rearwardly against the radial shoulder 34 of the counterbore 36 and the outer race 38 of the bearing 26 seats rearwardly against the transducer 24. A rearwardly facing annular shoulder 40 on the spindle 28 in turn seats rearwardly against the inner race 42 of the bearing 26. Thus, the spindle 28 normally rotates freely in the head 16. However, when the drill 22 engages the work 20, rearward thrust exerted on the spindle 28 is transmitted through the bearing 26 to the transducer 24 and the latter is compressed to generate an electrical impulse or signal which is transmitted to the tool detector apparatus of this invention through an electrical conductor 44. The latter may be connected to the transducer 24 in any suitable manner but the connection preferably is made as shown in the copending application Serial No. 258,812, which was filed February 15, 1963 in the name of Guy Donald Pierce. A bearing retainer 46 on the forward end of the tool head 16 holds the front bearing 26 in the counterbore 36 and a seal 48 is provided between the bearing retainer and the spindle.

Attention is now directed to FIG. 3 which shows electrical circuitry embodying the invention which responds to an impulse or signal from the transducer 24 to retract the tool head 16 from the work 20 immediately in the event a tool is broken or set too short. Specifically, a source of line voltage 50 is applied to the primary winding 52 of an isolation transformer 54. The alternating voltage appearing across the secondary winding 56 of the transformer 54 is applied across the serially interconnected resistor 58, rectifier 60 and capacitor 62 and also across the serially connected rectifier 64 and capacitor 66 which are grounded at 68. The resultant rectified voltage is impressed on the cathode 70 of a triode T1a through the circuit limiting resistor 72 and potentiometer 74. Cathode 70 is also connected to ground 76 through the resistor 78.

The output voltage produced by the transducer 24 is applied to the control grid 82 of the tube T1a through the resistor 84, and positive voltage on the grid permits current to flow between the cathode 70 and the plate 86 which is connected to ground through the cold-cathode gaseous-discharge voltage regulating diode VR1. The grid circuit also is connected to ground at 76 through the grid leak capacitor 88 and the resistor 90.

When triode T1a is energized, positive voltage from the potentiometer 74 is applied on the grid 92 of a second triode T1b which permits amplified current from the voltage regulator circuit to flow between the cathode 94 and the plate 96 and through the control relay CR1 which has a pair of normally closed contacts CR1—1 in the main control circuit of the machine tool.

Only a fragmentary part of the main control circuit of the machine tool is shown in the interest of simplicity as these circuits vary widely depending in each instance on the size and nature of the machine and the operations to be performed thereby. It is a feature of the present invention, however, that the main control circuit includes a relay CR2 which when energized causes the head 16 to retract. In a typical situation, the head 16 is slidably actuated by a hydraulic cylinder controlled by a solenoid operated valve and the relay CR2 is connected in a conventional manner to the solenoid which positions the valve to retract the head. In addition to the above, the machine control circuit is equipped with a switch 98 (sometimes referred to herein as a "part present switch") which is closed when a workpiece 20 is in the machine. This switch may be manually operable by the machine operator when he observes a part in the machine, or it can be operated automatically by the part itself. The latter arrangement is shown in FIG. 1.

Also, connected in series with the part present switch 98, relay CR2 and the relay contact CR1—1 is a switch 100 which conveniently can be mounted on the support 12 below the saddle 14 of the head 16 for operation by a dog 102 on the saddle. The switch 100 is normally open as shown in FIG. 3 and is positioned on the support 12 so that the dog 102 engages and closes it precisely at the instant the tool 22 when unbroken and properly set is adapted to engage the workpiece 20.

In operation, the workpiece 20 is located and clamped on the support 18 as shown in FIG. 1 and when present it closes the switch 98 to prepare the main control circuit of the machine for normal operation. Considering for the moment the particular work station only shown in FIG. 1, it will be assumed that the machine operator has pushed the cycle start switch with which machines of the type here under consideration conventionally are equipped and that this has caused the head 16 to advance toward the workpiece 20. At the instant the properly set tool 22 engages the workpiece 20, the dog 102 engages and closes the switch 100. Under these conditions closure of the switch 100 does not complete a circuit through the relay CR2 to retract the head 16, however, because pressure exerted by the cutting tool 22 against the work 20 also exerts thrust against the transducer 24. Mechanical energy absorbed by the transducer 24 generates an electrical charge in the transducer and this in turn fires the triode T1a to permit a relay operating current to flow through the triode T1b and energize the relay CR1 which in turn opens the contacts CR1—1. Manifestly, opening of the relay contacts CR1—1 prevents energization of relay CR2 even though the switch 100 is closed. As a consequence, the head 16 completes its forward travel and the drill 22 performs the desired cutting operation on the workpiece 20.

However, if the cutting tool 22 had been broken on the previous cycle of the machine, or if the tool 22 was set too short, the transducer 24 is not energized at the same time that the switch 100 is closed, and in this event the relay CR1 is not energized and the relay contacts CR1—1 remain closed. Thus, closure of the switch 100 under these conditions immediately energizes the relay CR2 which in turn promptly retracts the head 16. Manifestly, then, the head 16 returns immediately if the drill 22 does not sense the presence of a workpiece when it has advanced to the point where it should engage a workpiece and this fact apprises the machine operator that something is wrong with the tool 22. Instead of retracting the head 16 the relay CR2 could of course perform any other desired operation that would apprise the operator of the fact that something was wrong. For example, the relay could be used alternatively or in addition to stop the entire operation of the machine or simply to light a warning light at the operator's panel or at the main control panel of the machine.

In view of the foregoing, it will be readily apparent that each work station in a multi-station machine tool would be equipped with a part present switch 98 in order to condition the machine tool for normal operation. When a workpiece is first loaded into a machine, work of course is performed only in the first work station as workpieces have not yet progressed to any of the other stations. However, the usual practice is to have all of the tool heads go through their normal cycle regardless of whether there are parts or work present in the work stations. With the present arrangement, therefore, if no part is present, the switch 98 remains open and the relay CR2 is not energized even though the switch 100 is closed by its operating dog 102 and even though the relay contacts CR1—1 remain closed because the transducer 24 in that work station has failed to sense a workpiece when the tool head has advanced to the point where the cutting tool should engage a workpiece. As workpieces progress through the machine, however, the parts present switches 98 on all of the work stations occupied by a workpiece are closed and in those stations the failure of the transducer in any of the tool heads in those stations to sense the presence of a workpiece at the proper time results immediately in the shutting down of the machine or in the performance of some other operation to apprise the operator that a tool is broken or misset.

What is claimed is:
1. A machine tool having
multiple work stations
 each having
work supporting means,
tool carrying and actuating means
 operable to advance and retract tool means to and from work in said support means,
signal generating means
 associated with said tool carrying and actuating means responsive to force exerted by said tool means against the work for providing an electrical signal, and
electrical circuit means
 including said signal generating means having
means
 responsive to an electrical signal from said signal generating means to prepare said electrical circuit means and said machine for normal operation and responsive to the absence of a signal from said signal generating means to interrupt normal operation of said electrical circuit means and said machine, and
switch means
 normally disabling said electrical circuit operable by said tool carrying and actuating means when the latter is advanced to a position where the tool should engage the work to condition said electrical circuit means for normal operation.
2. In a machine tool having
multiple work stations
 each equipped with work supporting means,
tool carrying and actuating means
 operative to advance and retract tool means to and from work in said support means,
a transducer
 arranged to sustain thrust exerted by said tool means against said work in use and operative as a result of said thrust to generate an electrical impulse,
electrical circuit means
 including said transducer having
means
 responsive to an electrical impulse from said transducer to prepare said electrical circuit means and said machine for normal operation and responsive to the absence of said electrical impulse to interrupt said electrical circuit means and normal operation of the machine, and
switch means
 in said electrical circuit means normally disabling the latter and said impulse responsive means operable by said tool carrying and actuating means when the latter is advanced to a position where the tool should engage the work to condition said electrical circuit means for normal operation.
3. In a machine tool having
multiple work stations
 each having
working supporting means,
tool carrying and actuating means
 operative to advance and retract tool means to and from work in said support means,
a transducer
 responsive to pressure occurring when said tool means engages said work to generate an electrical impulse,
electrical circuit means
 including said transducer having
means
 responsive to an electrical impulse from said transducer to prepare said electrical circuit means and said machine for normal operation and responsive to the absence of said electrical impulse to interrupt said electrical circuit means and normal operation of said machine,
a switch
 normally disabling said electrical circuit means operable by said tool carrying and actuating means when the latter is advanced to a position where the tool should engage the work to prepare said electrical circuit means and said impulse responsive means for normal operation, and
at least one part present switch
 in said electrical circuit means adapted to be closed to indicate the presence of work in the machine and operative when closed to condition said electrical circuit means and said impulse responsive means for normal operation,
 said part present switch adapted to be open when there is no work present which it is adapted to indicate and operative when open to interrupt said electrical circuit means and normal operation of said machine.
4. In a machine tool having
multiple work stations
 each provided with
work supporting means,
tool carrying and actuating means
 operable to advance and retract tool means to and from work in said support means,
a transducer
 responsive to pressure occurring when said tool means engages said work to generate an electrical impulse,
electrical circuit means
including said transducer having
means
responsive to an electrical impulse from said transducer to prepare said machine for normal operation and responsive to the absence of said electrical impulse to interrupt normal operation of the machine, and
a pair of series-connected normally open switches
in said electrical circuit means adapted when open to disable said electrical circuit means and when closed to render said electrical circuit means normally operable.

5. In a machine tool having
multiple work stations
each provided with
work supporting means,
tool carrying and actuating means
operable to advance and retract tool means to and from work in said support means,
a transducer
responsive to pressure occurring when said tool means engages said work to generate an electrical impulse,
electrical circuit means
including said transducer having
means
responsive to an electrical impulse from said transducer to prepare said electrical circuit means and said machine for normal operation and responsive to the absence of said electrical impulse to interrupt said electrical circuit means and normal operation of the machine, and
a pair of series-connected normally open switches
in said electrical circuit means adapted when open to interrupt said circuit and to disable said impulse responsive means and when closed to condition said circuit and said impulse responsive means for normal operation, one of said switches adapted to be closed to indicate the presence of work in said work support means, the other of said switches being closable automatically by a moving part of said machine tool at the instant said tool means is adapted to engage said work, whereby engagement of said tool means with said work at the time said other switch is closed prevents disabling of said impulse responsive means, and whereby failure of said tool means to engage said work at the instant said other switch is closed results in disabling of said impulse responsive means and the interruption of the normal operation of said machine tool.

6. In a machine tool having
multiple work stations
each provided with
work supporting means,
tool carrying and actuating means
operable to advance and retract tool means to and from work in said support means,
a transducer
responsive to pressure occurring when said tool means engages said work to generate an electrical impulse,
electrical circuit means
including said transducer having
means
responsive to an electrical impulse from said transducer to condition said machine for normal operation and responsive to the absence of said electrical impulse to interrupt said electrical circuit means and normal operation of the machine, and
a pair of series-connected normally open switches
in said electrical circuit means adapted when open to interrupt said circuit and to disable said impulse responsive means and when closed to condition said circuit and said impulse responsive means for normal operation, one of said switches being closable automatically by work in said work supporting means and the other of said switches being closable by said tool carrying and actuating means when the latter has advanced to the point where tool means is adapted to engage said work.

7. In a machine tool having multiple
work stations
each having
work supporting means,
tool carrying and actuating means
operative to advance and retract tool means to and from work in said support means,
signal generating means
associated with said tool carrying and actuating means responsive to force exerted by said tool means against the work for providing an electrical signal,
electrical circuit means
including said signal generating means and means responsive to an electrical signal from said signal generating means to prepare said electrical circuit means for normal operation and responsive to the absence of said electrical signal to interrupt normal operation of said electrical circuit means,
a switch
normally disabling said electrical circuit means operable by said tool carrying and actuating means when the latter is advanced to a position where the tool should engage the work to prepare said electrical circuit means for normal operation, and
at least one part present switch
in said electrical circuit means adapted to be closed to indicate the presence of work in the machine and operative when closed to condition said electrical circuit means for normal operation, said part present switch adapted to be open when there is no work present in the machine and operative when open to interrupt said electrical circuit means.

8. In a machine tool having
multiple work stations
each provided with
work supporting means,
tool carrying and actuating means
operable to advance and retract tool means to and from work in said support means,
signal generating means
associated with said tool carrying and actuating means responsive to force exerted by said tool means against the work for providing an electrical signal,
electrical circuit means
including said signal generating means and
means
responsive to an electrical signal from said signal generating means to prepare said machine for normal operation and responsive to the absence of said electrical signal to interrupt normal operation of the machine, and
a pair of series connected normally open switches
in said electrical circuit means adapted when open to disable said electrical circuit means and when closed to render said electrical circuit means normally operable.

9. In a machine tool having
multiple work stations
each provided with work supporting means,
tool carrying and actuating means
> operable to advance and retract tool means to and from work in said support means, signal generating means
> associated with said tool carrying and actuating means responsive to force exerted by said tool means against the work for providing an electrical signal, electrical circuit means
> including said signal generating means and means
> responsive to an electrical signal from said signal generating means to prepare said electrical circuit means and said machine for normal operation and responsive to the absence of said electrical signal to interrupt said electrical circuit means and normal operation of the machine, and a pair of series-connected normally open switches
> in said electrical circuit means adapted when open to interrupt said circuit and to disable said signal responsive means and when closed to condition said circuit and said signal responsive means for normal operation, one of said switches adapted to be closed to indicate the presence of work in said work support means, the other of said switches being closable automatically by a moving part of said machine tool at the instant said tool is adapted to engage said work, whereby engagement of said tool means with said work at the time said other switch is closed prevents disabling of said signal responsive means and whereby failure of said tool means to engage said work at the instant said other switch is closed results in disabling of said signal responsive means and the interruption of the normal operation of said machine tool.

10. In a machine tool having
multiple work stations
> each provided with work supporting means,
tool carrying and actuating means
> operable to advance and retract tool means to and from work in said support means, signal generating means
> associated with said tool carrying and actuating means responsive to force exerted by said tool means against the work for providing an electrical signal, electrical circuit means
> including said signal generating means and means
> responsive to an electrical signal from said signal generating means to condition said machine for normal operation and responsive to the absence of said electrical signal to interrupt said electrical circuit means and normal operation of the machine, and a pair of series-connected normally open switches
> in said electrical circuit means adapted when open to interrupt said circuit and to disable said signal responsive means and when closed to condition said circuit and said signal responsive means for normal operation, one of said switches being closable automatically by work in said work supporting means and the other of said switches being closable by said tool carrying and actuating means when the latter has advanced to the point where said tool means is adapted to engage said work.

No references cited.

ANDREW R. JUHASZ, *Primary Examiner.*